4 Sheets—Sheet 1.

R. T. SMITH.

Paper Perforating Machine.

No. 9,653. Reissued April 12, 1881.

Witnesses:

G. O. Perkins

L. L. Tilden

Inventor:

Roswell Tenney Smith

By C. B. Tilden

Attorney

R. T. SMITH.

Paper Perforating Machine.

No. 9,653. Reissued April 12, 1881.

Witnesses.

E. O. Perkins

L. L. Tilden

Inventor.

Roswell Tenney Smith

By C. B. Tilden

Attorney

R. T. SMITH.

Paper Perforating Machine.

No. 9,653. Reissued April 12, 1881.

Witnesses,

E. C. Perkins,

L. L. Tilden

Inventor,

Roswell Tenney Smith

By C. B. Tilden

Attorney

R. T. SMITH.

Paper Perforating Machine.

No. 9,653. Reissued April 12, 1881.

Witnesses.

E. C. Perkins

L. L. Tilden

Inventor.

Roswell Tenney Smith

By C. B. Tilden

Attorney

UNITED STATES PATENT OFFICE.

ROSWELL T. SMITH, OF NASHUA, NEW HAMPSHIRE.

PAPER-PERFORATING MACHINE.

SPECIFICATION forming part of Reissued Letters Patent No. 9,653, dated April 12, 1881.

Original No. 223,866, dated January 27, 1880. Application for reissue filed October 26, 1880.

*To all whom it may concern:*

Be it known that I, ROSWELL TENNY SMITH, of Nashua, in the county of Hillsborough and State of New Hampshire, have invented an Improvement in Machines for Perforating Paper for Automatic Musical Instruments, of which the following is a specification.

My invention relates to mechanism for cutting the music-paper used in automatic organs; and it consists in a certain novel combination and arrangement of mechanical elements operating automatically, by which the open spaces in the paper sheet, indicating the musical notation, may be formed after any desired arrangement, the relative length and arrangement of the several openings representing the relative value of the different notes and the successive combinations of musical sounds.

It well known that in the automatic organs now in use the various melodies to be performed are represented upon long sheets of paper by perforations or openings cut therein, the several combinations of sounds depending upon the relative arrangement and the individual length of each of said perforations. As the possible arrangements are infinite in number, it follows that there is no limit to the number of musical compositions which can be rendered by any single instrument, except the cost of supplying the music-paper. This single item is entitled to serious consideration in view of the fact that at present these music-sheets are cut by hand—a fact which greatly increases their cost. Moreover, as their production is a work requiring a high degree of accuracy and care, it is almost impossible to avoid slight errors which may affect the harmony.

By my invention these objections are wholly overcome, since my machine will not only cut any given arrangement of note-perforations with mathematical accuracy, but will also perform the work at a very low cost.

Figure 1:
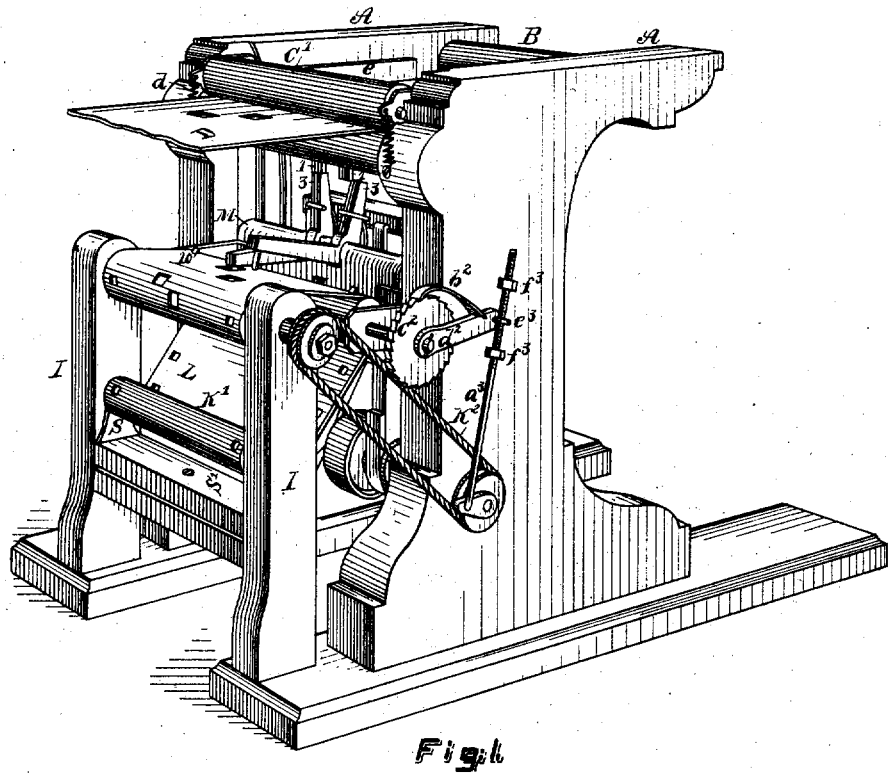
Figure 2:
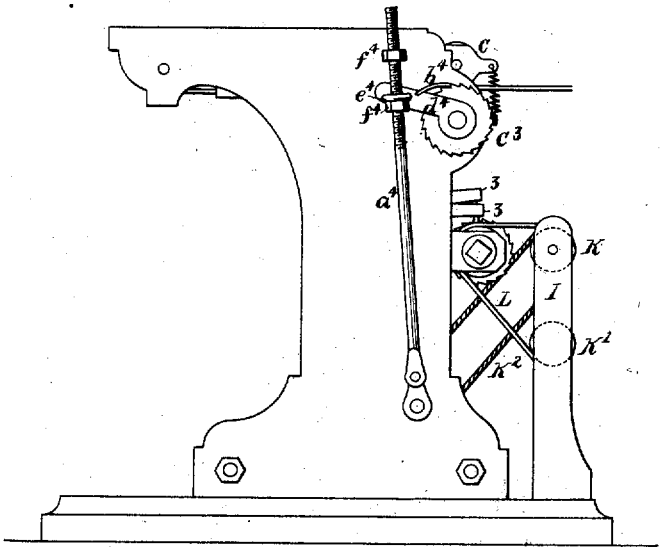
Figure 3:
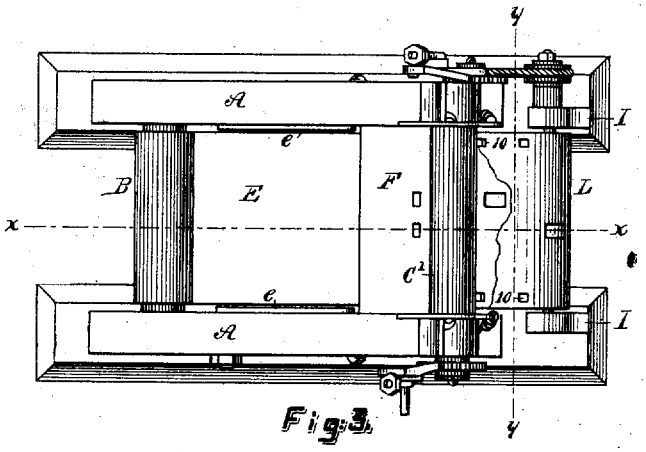
Figure 4:
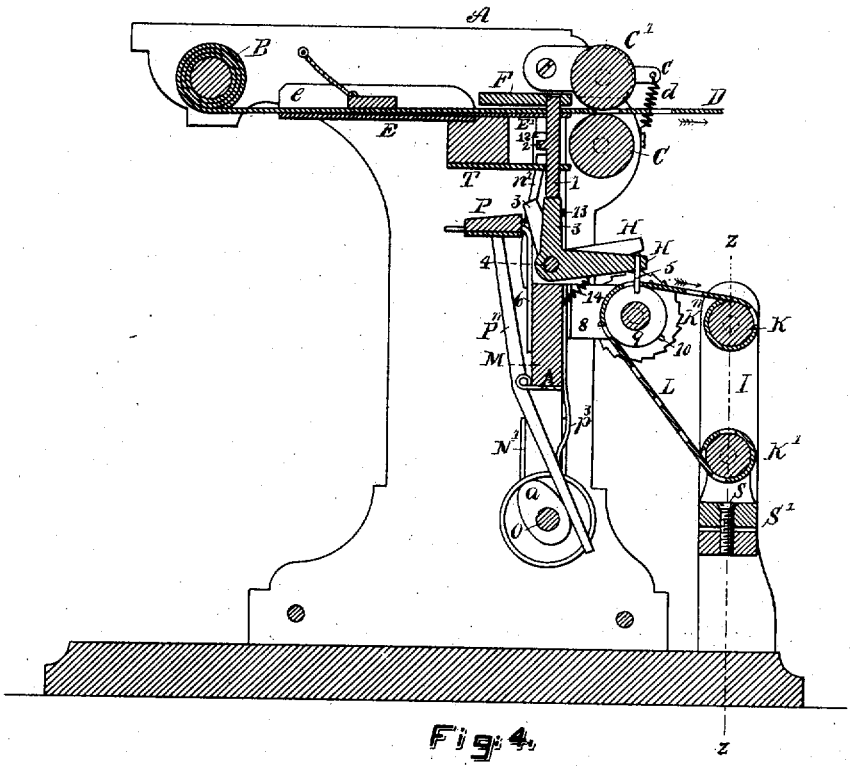
Figure 5:
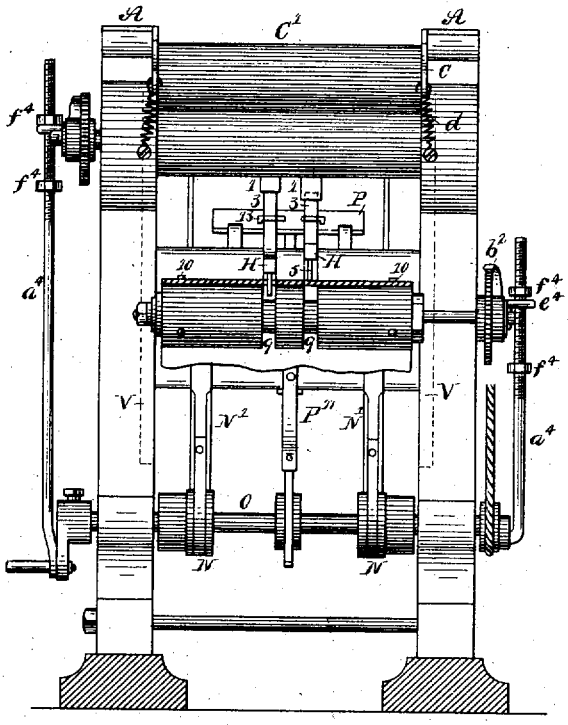
Figure 6:
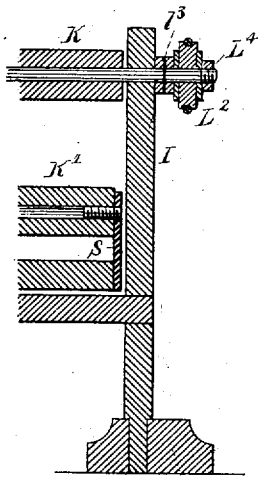

Referring to the drawings, which form part of this application, Figure 1 is a perspective view of the machine in which my invention is embodied. Fig. 2 is a side elevation thereof, taken from the right-hand side of the machine. Fig. 3 is a plan view. Fig. 4 is a section taken upon the line *x x* in Fig. 3. Fig. 5 is a view, partly in section and partly in elevation, taken upon the line *y y* in Fig. 3, the front rolls being removed from the machine. Fig. 6 is a vertical longitudinal section taken upon the line *z z*, Fig. 4, part of the mechanism being broken away.

The same letters and numbers indicate like parts in all the figures.

A A indicate the frame of the machine, in which the operative parts are supported. Near the upper and rearward portion of this frame is placed a roll, B, which carries the blank sheet of paper upon which the machine is to operate. This roll is journaled in the frame A A, and is arranged to turn easily and deliver the paper as fast as it is required.

At the front of the machine and near its top are placed two rolls, C C′, so arranged that their tangent line shall be in about the same plane with the lower side of roll B. The upper of these two rolls—viz., C′—is journaled in pivoted bearings *c c*, by means of which the two rolls may be separated from contact with each other for the purpose of introducing or removing the paper sheet, the pivoted bearing-plates *c c* being connected to the frame A A by spiral springs *d d*, hooked into an eye upon the plates. These springs exert a sufficient pressure upon the lower roll to insure the uniform and accurate feed of the paper sheet D, which passes between them. Motion is imparted to these feeding-rolls by means of a pawl-and-ratchet movement connected with the main shaft of the machine, (see Figs. 2 and 5,) which will be described hereinafter.

Between the two rolls C C′ and the roll B is placed a guide-bed, E, (see Fig. 4,) having flanged sides *e e*, the width of the bed E, inside the flanges, being just equal to the width of the paper sheet D, which, in passing from the roll B to the feed-rolls, moves between the flanges *e e*, by which all lateral displacement is prevented, thereby causing the several series of perforations to be cut exactly parallel to each other and to the edges of the sheet.

The cutting-punches are placed behind and near the feed-rolls. They consist each of a straight rectangular block of metal, 1, (see Fig. 4,) arranged in a series which is precisely parallel to the axes of the feed-rolls C C′. The distance between the several punches is equal to the space left between the rows of perforations in the music-sheet, and their number is equal to the number of rows to be cut; and this may, of course, be varied, if desirable.

I will here remark, also, that in the drawings accompanying this application I have shown two (2) punches only with their connected mechanism, since to illustrate a greater number would be merely a reduplication of these parts and unnecessary to the disclosure of the invention.

The punches 1 cut upon their upward movement, passing through a continuation, E′, of the guide-bed E, and then into a die-plate, F, placed just above the bed E′, the paper sheet, as it is fed to the punches, passing between the said bed-plate and die-plate. Now, it is evident that if the entire series of punches should act at each stroke of the prime motor (the paper sheet being fed, between the successive strokes, a distance nearly equal to the thickness of the punches) the result would be merely a sheet having a series of strips cut therefrom at regular intervals, whereas it is necessary that some of the cuts shall be very short, while others are of considerable length, their relative arrangement also being very irregular. It follows, therefore, that out of the whole series of punches certain selected members thereof must be called into operation at any given stroke, the remaining punches being at the same time inactive, leaving that portion of the paper sheet which lies above them unperforated. This selecting out of the entire series of the particular punches required to act at a particular point and the rejection by the mechanism of the remaining punches must be automatic and mathematically accurate. I will now describe the means by which I accomplish this result.

The punches are arranged, as already stated, in a single row or series and placed behind and parallel with the feed-rolls C C′. Each punch is capable of separate and independent operation, being in no way connected with the adjacent punches. When not in operation they rest beneath the die plate F, their upper or cutting extremities being a trifle below the upper surface of the bed-plate E′, in which position they are sustained by a tooth, 2, formed on each punch, which rests on the guide-plate T. Directly beneath the punches is placed a series of dogs, 3, mounted upon a carrier-frame, M, to which vertical reciprocation is imparted at each revolution of the main shaft O by means of eccentrics N N and pitmen N′ N′. The carrier-frame is guided in its movement by grooves V V cut in the frame A A. Each dog is mounted upon a pivot-bearing, 4, and is provided with an arm, H, extending forward and having at its extremity a pin, 5. Each dog is also provided with a spring, 6, pressing upon the rear face of the dog and holding it, when not otherwise acted upon, in a vertical position. When in this position the dogs 3 are directly beneath and in engagement with the punches 1. If the machine is now operated through a partial revolution of the main shaft, the carrier M will rise, carrying the dogs 3 up with it and driving the whole series of punches upward at the same moment, forming a series of perforations in the paper sheet D corresponding with the whole number of punches.

Upon the front of the machine, and directly under the ends of the arms H, is placed a roll, K″, journaled in plates 8 8, which are secured to the frame A. This roll is provided with a series of openings, 9 9, so formed and arranged that the pins 5 upon the extremities of the arms H may drop into said openings when the arms are depressed sufficiently to bring the dogs 3 under and into engagement with the punches 1.

Over the roll K″, which is rotated by means hereinafter described, is led a sheet, L, of paper or other suitable material, said sheet passing from a lower delivering-roll, K′, placed in standards I I in front of the machine, and being taken up after leaving the roll K″ by a receiving-roll, K. This sheet, which is called the "stencil," is provided with a series of perforations having a fixed relation in length, and in their relative positions with the cuttings which are to be formed in the paper sheet D. It has also a rack cut upon or near its edges, to engage with cogs or teeth 10 upon the ends of the roll K″. When the sheet is placed thereon, with the teeth or cogs 10 engaging with said rack, the several rows or series of perforations will coincide in position with the openings 9 9 of the roll.

Now, as the stencil-sheet is fed forward by the rotation of the roll K″, the moment that any one or more of the perforations therein falls beneath one or more of the pins 5 it will permit such pin or pins to drop through and descend into the openings in the roll, thereby depressing the arms H and bringing the corresponding dogs under and in engagement with the punches above said dogs. The remaining openings in the roll being covered by the unperforated portions of the stencil-sheet, the pins upon the remaining arms rest thereon, and are thus prevented from dropping, whereby the dogs actuated by said arms are held out of engagement with their punches, as shown in Fig. 4. At this moment, the paper sheet and stencil being both stationary, the carrier M rises, and those punches which happen to be in engagement with the dogs, in the manner described, are driven up through the paper, each punch forming a single cut therein. The carrier-frame M immediately descends, drawing all those punches which have been called into operation down with it by means of a yoke, 12, attached to the carrier-frame and passing over a series of teeth, 2, formed upon the backs of the punches. In the same manner the whole, or any number less than the whole, series of punches can be made to cut at the same instant, the selection of those punches which are required to act at any given point being indicated by the stencil-perforations and effected by the arms H and the dogs 3.

After each stroke of the punches the paper sheet D and stencil L must be fed one step forward in preparation for the successive stroke. Before the stencil moves, however, all of those pins 5 which happen to register with its perforations must be lifted out of the openings in the roll and out of contact with the stencil, to prevent the pins from catching in the ends of the cut spaces as the feed movement takes place, and thereby tearing the stencil. For this reason the arms H must be lifted far enough to raise all the pins above the stencil until the feed is accomplished, when the whole series must be released to allow those pins which register with perforations after the feed to drop into the openings in the stencil-roll, and thereby cause their dogs to engage with those punches which are required to act upon the next stroke. This is effected by means of a yoke, 13, mounted upon a yoke-carrier, P. This yoke passes from the carrier around in front of the whole series of dogs 3, the yoke-carrier being connected to the frame M by a lever, P″, pivoted to the lower part of said frame. This lever is actuated by a cam, *a*, on the shaft O, which throws the yoke-carrier backward, causing the yoke 13 to draw all the dogs 3 toward the rear and raise the entire series of arms H far enough to lift the pins 5 slightly above the stencil. The cam *a* acts between every stroke of the punches, the arrangement being such that the yoke 13 is operated and the arms H raised an instant before the feed of the stencil begins. The moment this is completed the cam leaves the lever P″, which is restored to its former position by a spring, $p^3$, causing the yoke to release the dogs, when as many of the pins 5 as may happen, after the feed movement, to register with perforations in the stencil will fall into the openings in the roll and cause the corresponding dogs to engage with those punches which are required to cut upon the next stroke. The remaining pins of the series will rest upon the imperforated portions of the stencil, and thereby prevent their dogs from engaging with those punches which are to remain inactive.

It should be noted that the same pin may many times successively be lifted out of and fall into the same perforation in the stencil, in which case the punch corresponding will cut at every stroke, forming (as each feed movement is slightly less than the thickness of the punch) a continuous cut or slot in the paper sheet D. The length of such cut will depend upon the number of successive strokes made by the same punch, and this will be determined by the length of the perforation in the stencil.

The feed of the paper sheet D is either exactly equal to or bears a certain fixed relation to the movement of the stencil-sheet L. The paper sheet is fed by the rolls C C′, their motion being derived from the main shaft by a pawl-and-ratchet movement connected with the lower roll. This consists of a pitman, $a^4$, attached to a crank on the shaft O, which said pitman operates a pawl, $b^4$, engaging with a ratchet-wheel on the lower roll-shaft. The pawl is carried by an arm, $d^4$, oscillating on the same shaft, and said arm is provided with an eye, $e^4$, through which the pitman passes, the end portion of the latter being threaded and provided with nuts $f^4$ $f^4$, (one on each side of the eye,) by which the movement of the arm, and consequently the throw of the pawl, can be regulated at pleasure. I can, by these devices, adjust the rate of feed with the greatest precision.

A similar combination of devices is used, in connection with the roll K″, to feed the stencil-sheet, the great advantage thereof being that the entire feed movement is accomplished during the time that the prime motor is performing a short arc of its circle of revolution. Thus the paper sheet and stencil are stationary during nearly the whole of each revolution of the main shaft, allowing the other parts of the mechanism ample time to perform their functions without interfering with the feed. It is evident, also, as already stated, that by these means the feed of both the stencil and the paper sheet can be so adjusted as to be exactly equal to or bear a certain fixed proportion to each other.

To secure the accurate performance of all these functions it is of the greatest importance that the stencil-sheet shall pass over the stencil-roll K″ at a fixed rate of speed from which there shall be no deviation, excepting as caused by adjustment of the feed-regulating devices. In order to secure this fixed and accurate feed-rate, teeth or cogs 10 are formed or placed on each end of the stencil-roll to engage with the rack cut in or near the edges of the stencil-sheet.

To insure the uniform engagement of the cogs with the rack, and also for the purpose of securing the greatest precision in the action of the dogs 3, it is necessary to apply some degree of tension to the stencil-sheet, by which it shall be drawn smoothly against and snugly up to the stencil-roll. This degree of tension, moreover, being once fixed, must suffer but little deviation, and I have devised the following simple and effective means for applying such tension:

The stencil is led or drawn from a delivery-roll, K′, journaled in a pivoted frame, S′, to permit the roll to oscillate. In the end of said roll is placed a short threaded bearing, having a head which rests against the outer surface of the journal-supporting plates S. By turning this threaded shaft the end of the roll may be made to hug the plate, and thus any desired amount of friction can be created. As the stencil is drawn off this roll by the revolution of the roll K″, the amount of friction which must be overcome, in order to revolve the roll K′ will determine the tension of the stencil-sheet. In order to overcome this friction, as well as to secure an accurate engagement of the cogs with the rack cut in the stencil, it is desirable that the receiving-roll K should exert a certain degree of draft upon the sheet to prevent the cogs from tearing out of the rack and to hold the sheet down upon the top of the roll. The roll K therefore receives motion from a pulley upon the main shaft geared by a belt with a pulley, $L^2$, upon its own shaft. This pulley is placed loosely upon the roll-shaft and clamped against a collar, $l^3$, fastened thereon by a nut, $L^4$. By tightening this nut the pulley may be made to exert a certain degree of draft upon the stencil-sheet; but beyond that point it will slip on its shaft without increasing the tension of the sheet. This result is necessary, because the pulley $L^2$ travels somewhat faster than the stencil is fed. By this friction-brake the draft of the roll K can be regulated in proportion to the resistance of the roll K′ and the tension produced by the roll K″. It should be so adjusted that the roll K and the roll K″ shall both contribute to overcome the resistance of the roll K′. One great advantage of this form of friction-brake is that the tension produced by it is constant, since the pulley is at each instant slipping upon its shaft, and at each instant also exerting the required amount of tension on the stencil necessary to overcome the degree of friction produced by the clamp-nut, this degree being nearly the same.

I have already stated that the paper sheet is fed by a pawl-and-ratchet movement connected with the main shaft. Exactly the same combination of elements is employed to impart motion to the roll K″ which feeds the stencil-sheet. It is not necessary, therefore, to give a detailed description of the latter.

Both stencil and paper sheet are fed by devices connected with the main shaft, but not acting at the same moment, as the feed movement of the stencil precedes that of the paper sheet by an instant of time. As the sheet D is drawn from the roll B it is apt to have a tremulous vibration, which has a tendency to produce fine wrinkles in its surface. This is readily overcome by laying a light weight on that part of the sheet which lies between the flanges *e e* of the guide-bed E and fastening said weight to the frame A A, so that the paper may slide beneath it. A simple bar of wood is sufficient for this purpose, and such a device is illustrated in Fig. 4.

Instead of the springs 6, I may use spiral springs 14, connected to the under side of arms H and to the frame M, as seen in Fig. 4. Also, instead of the dogs 3 being mounted upon a pivot bearing or support in the carrier-frame M, they may be caused to slide in grooves cut in said frame, in which case the arms H would engage with the stencil-roll upon the side of the roll next to the frame M, instead of upon the top of the roll. Moreover, by merely altering the angle between the arms H and dogs 3 their operation may be partially reversed, the dogs engaging with the punches when the arms H rest upon the stencil-sheet, and being disconnected from the punches when the pins 5 drop into the openings in the roll. Finally, the arms H, instead of being lifted by a yoke, 13, may be raised either by a cam-shaft placed beneath the arms or by a stationary plate placed in front of said arms in such a position that as the carrier-frame M descends the arms shall be lifted by striking the plate, while the arms shall, as they rise, merely tilt the plate.

In operating my machine I ordinarily pass from eight (8) to twelve (12) sheets between the feed-rolls C C′ simultaneously, as the machine works better upon a number of sheets than upon a single thickness. When several sheets are fed the number of rolls B is correspondingly increased, each roll delivering a single sheet. For this purpose the frame A A may be extended toward the rear as far as may be necessary to give room for the additional rolls. The stencil-sheet may also be passed between two rolls similar to feed-rolls C C′, instead of being wound off the roll K′, and in like manner may be drawn off the stencil-roll K″ by two similar rolls, instead of being wound on the roll K.

Having thus fully described my invention, what I claim as new, and desire to secure by Letters Patent of the United States, is—

1. In a machine for cutting music-paper for automatic organs, the combination of a series of independent punches or cutters and a corresponding series of dogs mounted upon a reciprocating support and having reciprocating motion and adapted to select at each reciprocation those punches required to act and to engage with and drive said selected punches, the proper selection being indicated by a stencil or pattern-sheet, as set forth.

2. The combination, in said machine, of a series of punches or cutters having independent operation, a corresponding series of dogs mounted on a reciprocating support and adapted at each reciprocation to automatically select, engage with, and operate those punches which are required to act, a separate pattern-sheet or stencil having openings of different lengths and varied arrangement, and adjustable feeding devices to regulate the motion of said stencil, as set forth.

3. The combination, in said machine, of a series of punches or cutters, a corresponding series of dogs mounted upon a reciprocating support and having forwardly-projecting arms provided with pins adapted to engage with and operate said punches, a pattern or stencil to indicate and determine the time of the relative action of said dogs, and a support for the stencil, having openings adapted to receive the ends of the arms after their passage through the stencil-sheet, as set forth.

4. The combination, with the feed-rolls C C′, provided with suitable mechanism for imparting motion thereto, of the series of independent punches 1, a corresponding and distinctly separate series of dogs, 3, having arms H, a reciprocating carrier, M, and stencil L, as set forth.

5. The combination, in a paper-perforating machine, of a series of independent punches, a series of dogs adapted to engage with and drive one or more of said punches, and a reciprocating frame carrying said dogs, as set forth.

6. The combination of the arms H, dogs 3, yoke 13, connected to and operated by the carrier M, and the cam-lever P″, as set forth.

7. The combination, with the series of punches 1, corresponding series of dogs 3, springs 6, arms H, reciprocating frame M, and yoke 13, of the cam-lever P″, stencil L, and roll K″, having openings, as set forth.

8. In a paper-perforating machine, the combination, with the stencil-roll, of a discharge-roll from which said stencil is taken, a take-up roll upon which it is wound, an adjustable friction device by which the tension of the stencil may be regulated, a series of teeth on the stencil-roll entering apertures in the stencil to prevent slipping, and the series of arms H and dogs 3, which select and operate the punches, as set forth.

9. In a paper-perforating machine, the combination, with the main shaft, of feed-rolls C C′, a pitman, $a^4$, connected to a pawl-and-ratchet feed on the shaft of roll C′, a stencil-roll, K″, pitman $a^3$, and a pawl-and-ratchet feed on the shaft of said stencil-roll, each pitman being connected to the pawl-carrier by adjustable stops, whereby the throw of the pawl may be regulated and the feed of the rolls C C′ and the stencil-roll K″ may be adjusted separately, substantially as and for the purpose set forth.

10. The combination, in a paper-perforating machine, of a series of independent punches, a series of dogs independently mounted upon a vertically-reciprocating support and adapted to engage automatically with and to drive said punches, a series of arms formed on and projecting from said dogs over a roll having openings formed therein, a series of pins projecting from said arms, and a stencil-sheet having a pattern consisting of openings of varied length and arrangement passing over said roll and adapted to support the pins upon its imperforate surface, and thereby hold the dogs out of engagement with their punches, or to permit said pins to drop through the perforations into the openings of the roll, thereby bringing the dogs into engagement with the punches, in the manner set forth.

11. In a paper-perforating machine, the combination of a roll having openings to which a fixed rate of speed is applied, a stencil or pattern sheet supported on said roll, a series of arms which rest on said stencil, and as it is fed forward drop through its perforations into the openings in the roll, a corresponding sesies of dogs connected with said arms and mounted on a vertically-reciprocating frame beneath the punches, a yoke to lift the arms above the stencil, and thereby disengage all the dogs from the punches during the feed of the sheet, and a cam and lever to retract said yoke, as set forth.

12. The combination, with the stencil-roll K″, its ratchet-feed, and devices for regulating the same, of the take-up roll K, pulley $L^2$, friction-clamp $L^4$, and belt-gearing $K^2$, as set forth.

13. A paper-perforating machine consisting of feed-rolls C C′, punches 1, yoke *n n′*, dogs 3, arms H, having pins 5, yoke 13, cam-lever P″, carrier M, stencil-roll K″, having openings, as described, rolls K K′, and stencil-sheet L, all combined as and for the purpose set forth.

14. The combination, in a perforating-machine, of a series of independent punches, a series of dogs adapted to engage with and to operate said punches, a pattern-sheet representing the relative length and arrangement of the sound-openings to be formed in the paper sheet, and by which the automatic selection of the punches is effected, and a feeding apparatus whereby a step-by-step movement is imparted to the paper sheet, each feed movement being of such length that those punches having repeated action may cut an opening adapted to give a continuous sound, instead of a series of separate sound-openings, substantially as and for the purpose set forth.

15. The combination, in said machine, of a series of punches or cutters having independent operation, a corresponding series of dogs adapted to automatically select, engage with, and operate those punches which are required to act, a separate pattern-sheet or stencil having openings of different length and irregular arrangement, and feeding devices to regulate the motion of said stencil, substantially as set forth.

In testimony whereof I have signed my name to the foregoing specification in the presence of two attesting witnesses.

ROSWELL TENNY SMITH.

In presence of—
C. E. P. SMITH,
L. L. TILDEN.